US012662033B2

(12) United States Patent
Negrut et al.

(10) Patent No.: US 12,662,033 B2
(45) Date of Patent: Jun. 23, 2026

(54) HEAD RESTRAINT GUIDE

(71) Applicant: GM Global Technology Operations LLC, Detroit, MI (US)

(72) Inventors: Dan Negrut, Wixom, MI (US); Anthony Saleh, Harper Woods, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 119 days.

(21) Appl. No.: 18/816,878

(22) Filed: Aug. 27, 2024

(65) Prior Publication Data

US 2026/0061913 A1 Mar. 5, 2026

(51) Int. Cl.
*B60N 2/812* (2018.01)

(52) U.S. Cl.
CPC .................................. *B60N 2/812* (2018.02)

(58) Field of Classification Search
CPC ......... B60N 2/812; B60N 2/897; B60N 2/815
See application file for complete search history.

(56) References Cited

U.S. PATENT DOCUMENTS

| | | | |
|---|---|---|---|
| 4,854,642 A | 8/1989 | Vidwans et al. | |
| 4,976,493 A | 12/1990 | Frankila | |
| 5,080,437 A | 1/1992 | Pesta et al. | |
| 7,370,915 B2 * | 5/2008 | Droche .................. | B60N 2/818 |
| | | | 297/391 |
| 7,506,936 B2 * | 3/2009 | Saberan .................. | B60N 2/832 |
| | | | 297/378.12 |
| 2006/0197366 A1 * | 9/2006 | Saberan .................. | B60N 2/829 |
| | | | 297/410 |

* cited by examiner

*Primary Examiner* — Philip J Bonzell
(74) *Attorney, Agent, or Firm* — Vivacqua Crane, PLLC

(57) ABSTRACT

A vehicle seat includes a seat back frame and a head restraint assembly supported on the seatback frame within a head restraint guide, the head restraint guide includes a cylindrical tubular body adapted to receive a support post of the head restraint assembly therein, and an integrated snap-finger extending radially inward and adapted to engage a notch formed within the support post, wherein upon insertion of the support post into the head restraint guide, the integrated snap-finger is adapted to flex radially outward allowing the support post to slide into the head restraint guide, and when the notch within the support post reaches the integrated snap-finger, the integrated snap-finger engages the notch, wherein, engagement of the integrated snap finger with the notch allows further insertion of the support post into the head restraint guide and prevents removal of the support post from the head restraint guide.

20 Claims, 8 Drawing Sheets

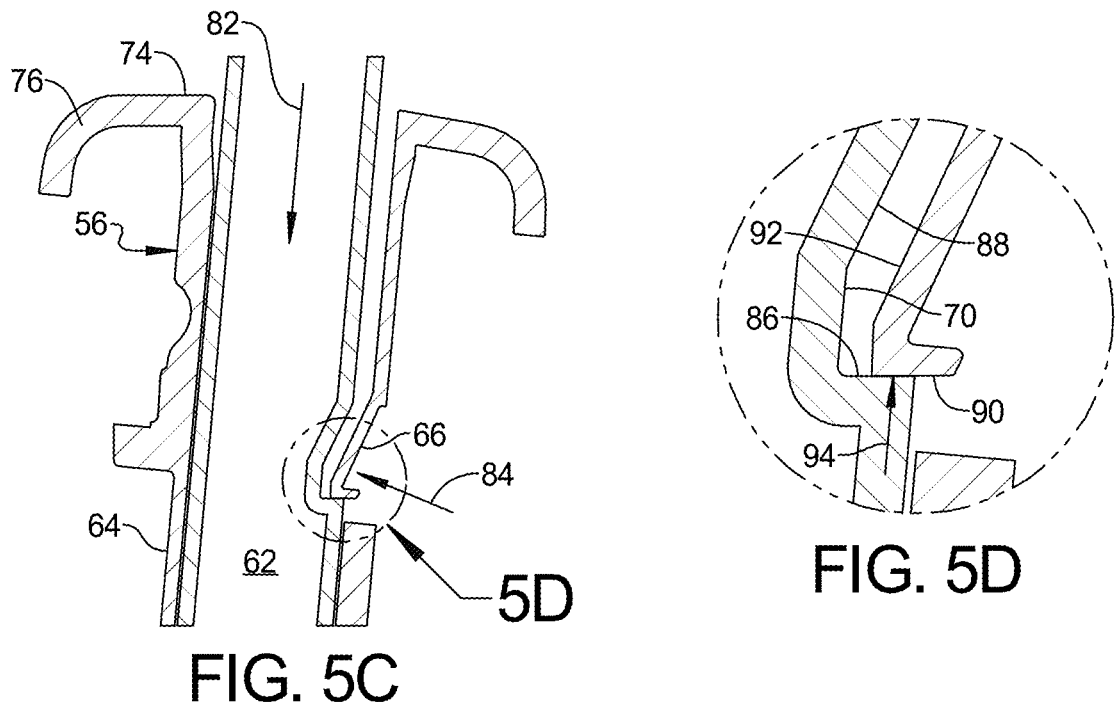
FIG. 5C
FIG. 5D
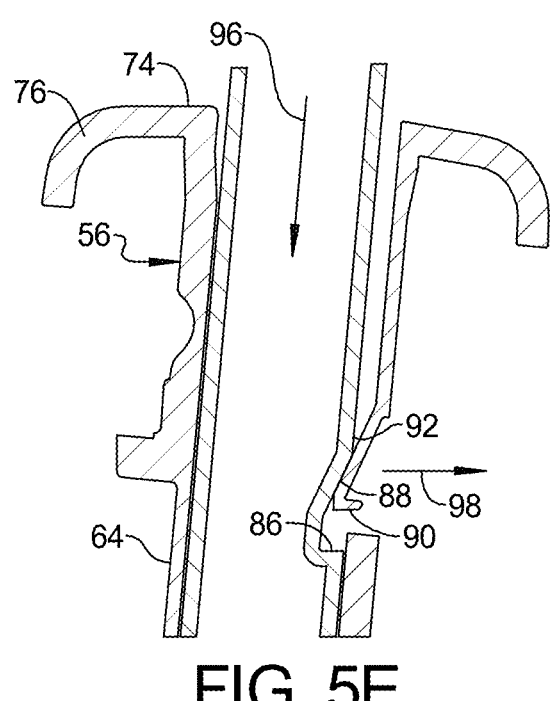
FIG. 5E

HEAD RESTRAINT GUIDE

INTRODUCTION

The present invention relates generally to a vehicle seat with a head restraint guide adapted to secure a head restraint assembly onto a seatback of the vehicle seat. Current vehicles include head restraints that are secured to the seat back with multiple components. Specifically current technology employs a guide to align and support a post of the head restraint within a frame of the seat back, and separate components to lock the head restraint onto the seat back, preventing inadvertent removal of the head restraint from the seat backseat.

Thus, while current vehicle seats achieve their intended purpose, there is a need for a new and improved vehicle seat having a single piece head restraint guide that provides error-proofing features to ensure the proper head restraint guide is installed and proper orientation of the head restraint guide and integrated locking features that allow a head restraint assembly to be installed and automatically engage the head restraint assembly to prevent inadvertent removal of the head restraint assembly and allowing selectable removal of the head restraint assembly when necessary.

SUMMARY

According to several aspects of the present disclosure, a vehicle seat includes a seat back frame, a head restraint assembly supported on the seatback frame within a head restraint guide, the head restraint guide including a cylindrical tubular body adapted to receive a support post of the head restraint assembly therein, and an integrated snap-finger formed within a side wall of the cylindrical tubular body and extending radially inward and adapted to engage a notch formed within the support post of the head restraint assembly, wherein upon insertion of the support post into the cylindrical tubular body of the head restraint guide, the integrated snap-finger is adapted to flex radially outward allowing the support post to slide into the cylindrical tubular body of the head restraint guide, and when the notch within the support post of the head restraint assembly reaches the integrated snap-finger, the integrated snap-finger engages the notch, wherein, engagement of the integrated snap finger with the notch allows further insertion of the support post into the head restraint guide and prevents removal of the support post from the head restraint guide.

According to another aspect, the notch within the support post of the head restraint assembly includes a flat upward facing surface and a ramped surface, and the snap-finger of the head restraint guide includes a flat downward facing surface and a ramped surface, wherein when the snap-finger is engaged with the notch, the flat upward facing surface of the notch engages the flat downward facing surface of the snap-finger, wherein the snap-finger provides a positive stop preventing the support post of the head restraint assembly from being pulled upward and out of the head restraint guide, and the ramped surface of the notch engages the ramped surface of the snap-finger, wherein further movement of the support post of the head restraint assembly into the head restraint guide flexes the snap-finger radially outward allowing the support post to be inserted further into the head restraint guide.

According to another aspect, the head restraint guide further includes a circular opening at a top of the cylindrical tubular body, a decorative flange extending radially outward from the top of the cylindrical tubular body, and a key-way formed within an inner radial edge of the flange, the key-way adapted to allow insertion of a tool between an inner surface of the cylindrical tubular body and an outer surface of the support post of the head restraint assembly, wherein insertion of the tool flexes the snap-finger radially outward, disengaging the snap-finger from the notch in the support post and allowing selective removal of the head restraint assembly from the head restraint guide.

According to another aspect, the key-way has a radial width that is between approximately nine tenths of a millimeter and approximately two millimeters, and a circumferential length that is between approximately nine tenths of a millimeter and at least two millimeters.

According to another aspect, the head restraint guide further includes a plurality of stand-off ribs extending longitudinally along and radially outward from an outer surface of the cylindrical tubular body, each of the plurality of stand-off ribs including a downward facing horizontal surface adapted to provide a positive stop to support the head restraint guide on the seat back frame and establish a height of the head restraint guide relative to the seat back frame, the cylindrical tubular body of the head restraint guide adapted to be inserted into and supported within an orifice formed within the seat back frame, each of the plurality of stand-off ribs extending outward from the outer surface of the cylindrical tubular body a distance sufficient to span any clearance between an inner edge of the orifice within the seat back frame and the cylindrical tubular body and to engage a support surface of the seat back frame to provide a positive stop preventing further insertion of the cylindrical tubular body into the orifice and to support the head restraint guide on and relative to the seat back frame.

According to another aspect, the vehicle seat further includes at least one locking nub extending radially outward from the outer surface of the cylindrical tubular body and being positioned below the downward facing surfaces of the plurality of stand-off ribs, the locking nub including a downward facing ramped surface adapted to allow the head restraint guide to be pushed into an orifice within the seat back frame, wherein as the head restraint guide is pushed into the orifice, the downward facing ramped surface of the locking nub engages the inner edge of the orifice within the seat back frame and causes the cylindrical tubular body of the head restraint guide to flex sufficiently to allow the locking nub to be inserted past the inner edge of the orifice, wherein, once the head restraint guide is pushed into the orifice within the seat back frame and the downward horizontal surface of each of the plurality of stand-off ribs contact the seat back frame and the locking nub is inserted past the inner edge of the orifice, the cylindrical tubular body of the head restraint guide is allowed to flex back wherein the inner edge of the orifice within the seat back frame is captured between the downward facing horizontal surface of each of the plurality of stand-off ribs and an upward facing horizontal surface of the locking nub, thereby securing the head restraint guide in position within the seat back frame.

According to another aspect, the head restraint guide further includes at least one error-proofing feature extending outward from the outer surface of the cylindrical tubular body, the at least one error proofing feature adapted to fit within a corresponding error-proofing notch formed within the inner edge of the orifice within the seat back frame and adapted to prevent insertion of the head restraint guide into the orifice within the seat back frame in an incorrect orientation.

According to another aspect, the at least one error-proofing feature is further adapted to prevent insertion of the head restraint guide into a non-matching seat back frame.

According to another aspect, the head restraint guide, including the cylindrical tubular body, the decorative flange, the plurality of stand-off ribs, the at least one locking nub and the snap-finger, is unitarily formed from a composite material, wherein flexing of the snap-finger during insertion and removal of the support post of the head restraint assembly and flexing of the cylindrical tubular body during insertion of the head restraint guide within the seat back frame does not plastically deform the head restraint guide.

According to another aspect, a distance from a head restraint cushion of the head restraint assembly to the flat upward facing surface of the notch formed within the support post of the head restraint assembly is at least the length of the tool used to remove the head restraint assembly from the head restraint guide added to the distance from the top of the cylindrical tubular body to the flat downward facing surface of the snap-finger, ensuring that there is adequate space to fit the tool between the decorative flange and the head restraint cushion for selective removal of the head restraint assembly from the head restraint guide.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 5C is a sectional view wherein the snap-finger of the head restraint guide is engaged with a notch formed within the support post;

FIG. 5D is an enlarged portion of FIG. 5C, as indicated by the circled portion of FIG. 5C labelled "FIG. 5D";

FIG. 5E is a sectional view wherein the support post is pushed further into the head restraint guide after the snap-finger has engaged the notch within the support post;

Figure 1:
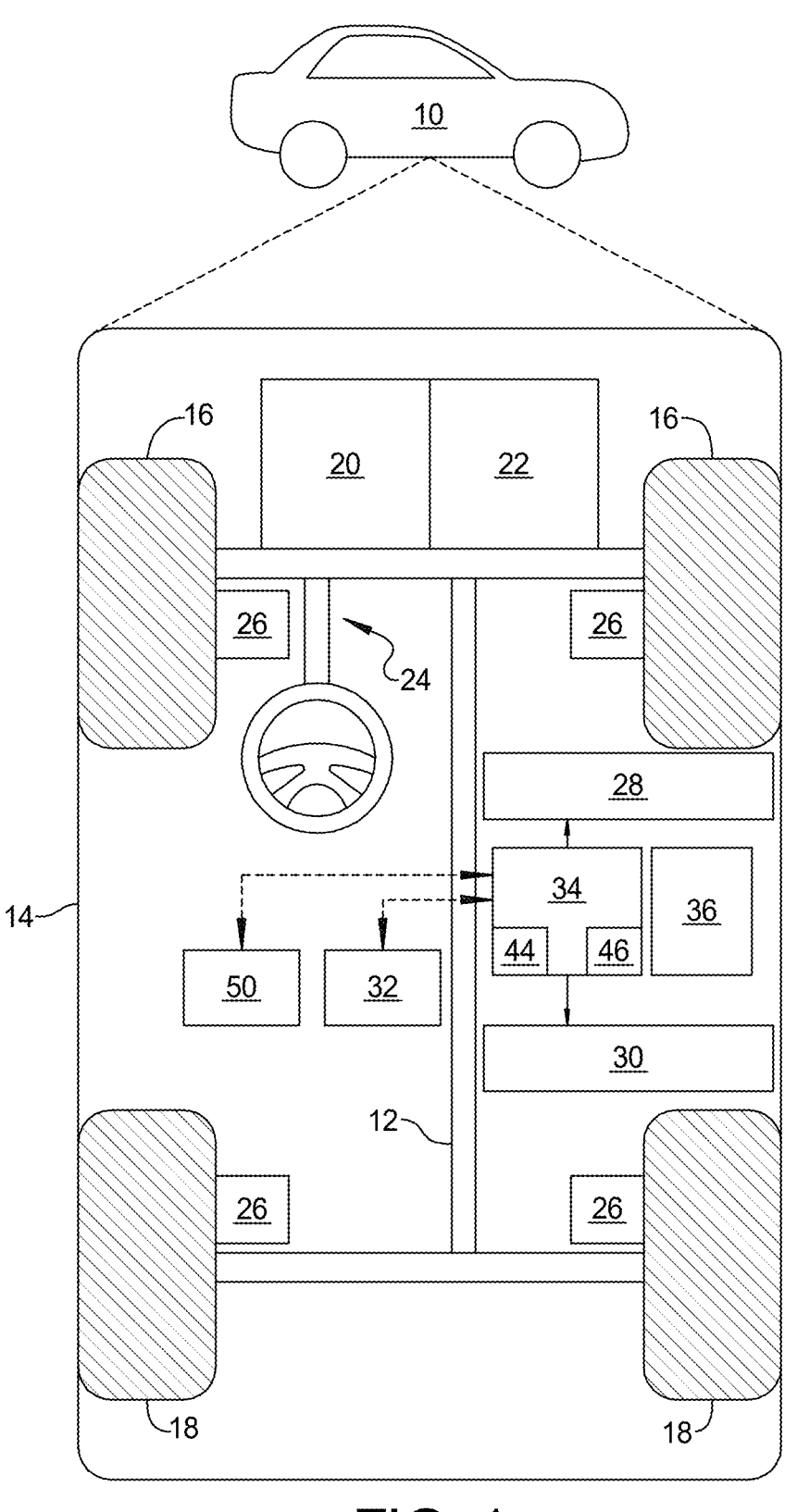
FIG. 1 is a schematic diagram of a vehicle according to an exemplary embodiment of the present disclosure.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of" Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of" any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about", with reference to percentages, comprises a variation of plus/minus 5%, "about", with reference to temperatures, comprises a variation of plus/minus five degrees, and "about", with reference to distances, comprises plus/minus 10%. In addition, disclosure of ranges includes disclosure of all values and further divided ranges within the entire range, including endpoints and sub-ranges given for the ranges. In addition, disclosure of ranges includes disclosure of all values and further divided ranges within the entire range, including endpoints and sub-ranges given for the ranges.

Example embodiments will now be described more fully with reference to the accompanying drawings. In accordance with an exemplary embodiment, FIG. 1 shows a vehicle 10 with an associated vehicle seat 50. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

In various embodiments, the vehicle 10 is an autonomous vehicle and the system 11 is incorporated into the autonomous vehicle 10. An autonomous vehicle 10 is, for example, a vehicle 10 that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the vehicle 10 is equipped with a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. The novel aspects of the present disclosure are also applicable to non-autonomous vehicles.

As shown, the vehicle 10 generally includes a propulsion system 20, a transmission system 22, a steering system 24, a brake system 26, a sensor system 28, an actuator system 30, at least one data storage device 32, a vehicle controller 34, and a wireless communication module 36. In an embodiment in which the vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios. According to various embodiments, the transmission system 22 may include a step-ratio automatic transmission, a continuously-variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, such as for a fully autonomous vehicle, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The cameras can include two or more digital cameras spaced at a selected distance from each other, in which the two or more digital cameras are used to obtain stereoscopic images of the surrounding environment in order to obtain a three-dimensional image or map. The plurality of sensing devices 40a-40n is used to determine information about an environment surrounding the vehicle 10. In an exemplary embodiment, the plurality of sensing devices 40a-40n includes at least one of a motor speed sensor, a motor torque sensor, an electric drive motor voltage and/or current sensor, an accelerator pedal position sensor, a coolant temperature sensor, a cooling fan speed sensor, and a transmission oil temperature sensor. In another exemplary embodiment, the plurality of sensing devices 40a-40n further includes sensors to determine information about the environment surrounding the vehicle 10, for example, an ambient air temperature sensor, a barometric pressure sensor, and/or a photo and/or video camera which is positioned to view the environment in front of the vehicle 10. In another exemplary embodiment, at least one of the plurality of sensing devices 40a-40n is capable of measuring distances in the environment surrounding the vehicle 10. The actuator system 30 includes one or more actuator devices 42a-42n that control one or more vehicle 10 features such as, but not limited to, the propulsion system 20, the transmission system 22, the steering system 24, and the brake system 26.

The vehicle controller 34 includes at least one processor 44 and a computer readable storage device or media 46. The at least one data processor 44 can be any custom made or commercially available processor, a central processing unit (CPU), a graphics processing unit (GPU), an auxiliary processor among several processors associated with the vehicle controller 34, a semi-conductor based microprocessor (in the form of a microchip or chip set), a macro-processor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the vehicle controller 34 are embodied in a trajectory planning system and, when executed by the at least one data processor 44, generates a trajectory output that addresses kinematic and dynamic constraints of the environment. For example, the instructions receive as input process sensor and map data. The instructions perform a graph-based approach with a customized cost function to handle different road scenarios in both urban and highway roads.

The wireless communication module 36 is configured to wirelessly communicate information to and from other remote entities 48, such as but not limited to, other vehicles ("V2V" communication,) infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The vehicle controller 34 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

Figures 2, 3:
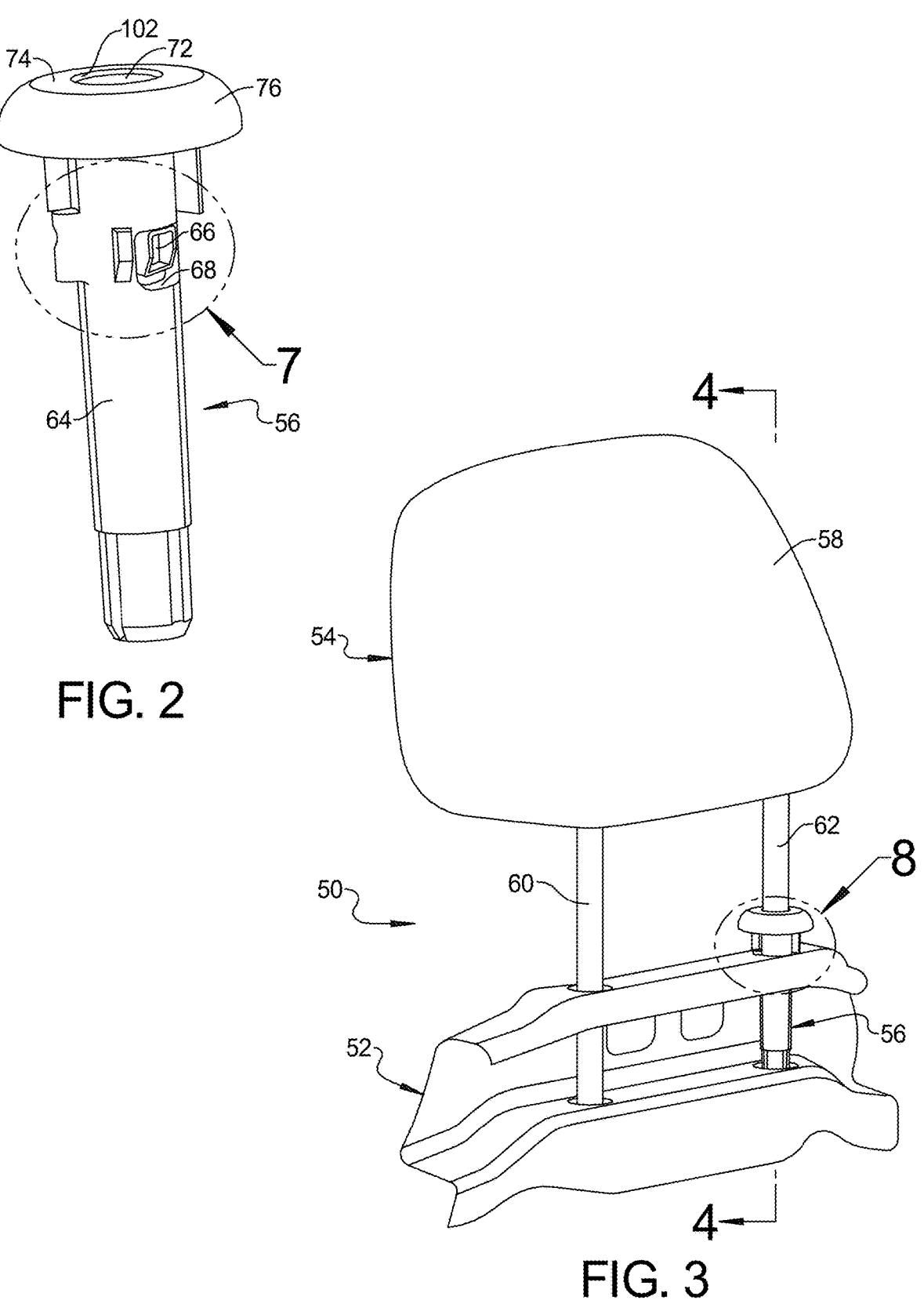
FIG. 2 is a perspective view of a head restraint guide in accordance with an exemplary embodiment of the present disclosure.
FIG. 3 is a schematic perspective view of a seat back frame, head restraint guide and head restraint assembly of a vehicle seat in accordance with an exemplary embodiment of the present disclosure.

Referring to FIG. 2 and FIG. 2, a vehicle seat 50 in accordance with novel features of the present disclosure includes a seat back frame 52, such as is known in the industry and adapted to support other seat components thereon, such as padding, covering, etc. A head restraint assembly 54 is supported on the seat back frame 52 within a head restraint guide 56. The head restraint assembly 54 includes a head restraint cushion 58 adapted to provide support for a head of a passenger seated within the vehicle seat 50 and two support posts 60, 62 extending downward from the head restraint cushion 58 and adapted to engage the seat back frame 52 to support the head restraint assembly 54 thereon. A first support post 60 engages the seat back frame 52 in ways that are known within the industry and may provide features such as height variability for the head restraint assembly 54. A second support post 62 engages the head restraint guide 56. The novel features of the present disclosure are not associated with the first support post 60, and thus, throughout the remainder of this Written Description, no further discussion will be included related to the first support post 60, and the second support post 62 will be referred to simply as the "support post 62".

Figure 4:
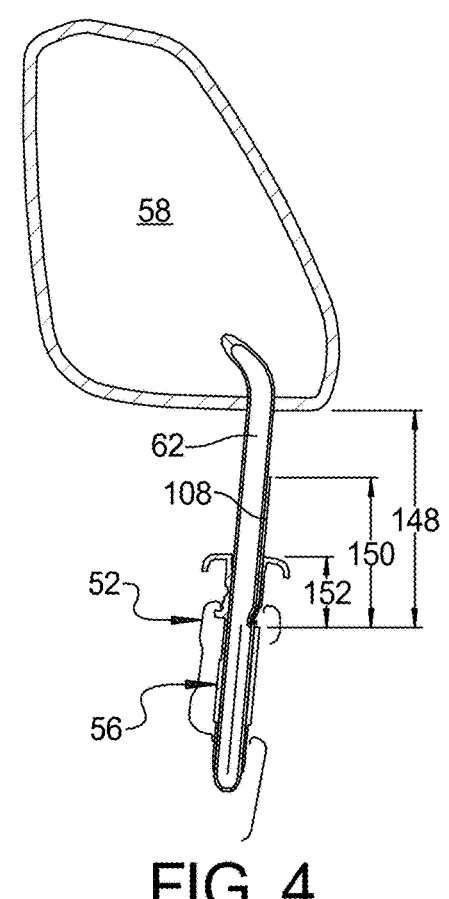
FIG. 4 is a sectional view taken along line 4-4 of FIG. 3.

Referring to FIG. 3 and FIG. 4, the head restraint guide 56 is supported within the seat back frame 52 and the support post 62 of the head restraint assembly 54 is inserted into and supported by the head restraint guide 56. In an exemplary embodiment, the head restraint guide 56 includes a cylindrical tubular body 64 adapted to receive the support post 62 of the head restraint assembly 54 therein. The cylindrical tubular body 64 includes an integrated snap-finger 66 formed within a side wall 68 of the cylindrical tubular body 64 and extending radially inward and adapted to engage a notch 70 formed within the support post 62 of the head restraint assembly 54.

Figures 5A, 5B:
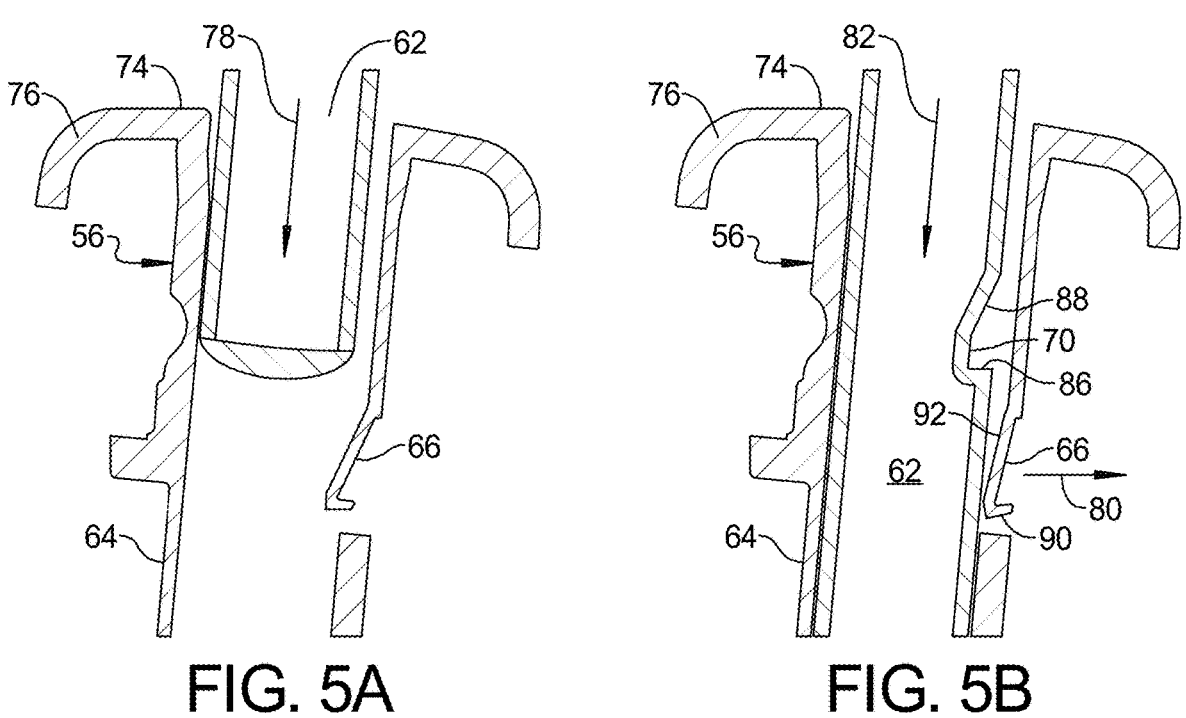
FIG. 5A is a sectional view of a support post of a head restraint assembly being inserted within a head restraint guide.
FIG. 5B is a sectional view wherein the support post of the head restraint assembly is pushing a snap-finger of the heat restraint guide radially outward.

Referring to FIG. 5A, the head restraint guide 56 further includes a circular opening 72 at a top 74 of the cylindrical tubular body 64, and a decorative flange 76 extending radially outward from the top 74 of the cylindrical tubular body 64. The support post 62 of the head restraint assembly 54 is adapted to fit within the circular opening 72 of the head restraint guide 56 during insertion of the support post 62 into the head restraint guide 56, as indicated by arrow 78. Referring to FIG. 5B, when the support post 62 hits the inwardly extending snap-finger 66 of the head restraint guide 56, the integrated snap-finger 66 is adapted to flex radially outward, as indicated by arrow 80, allowing the support post 62 to slide into the cylindrical tubular body 64 of the head restraint guide 56, as indicated by arrow 82.

Referring to FIG. 5C, when the notch 70 within the support post 62 of the head restraint assembly 54 reaches the integrated snap-finger 66, the integrated snap-finger 66 engages the notch 70, as indicated by arrow 84, wherein, engagement of the integrated snap finger 66 with the notch 70 allows further insertion of the support post 62 into the head restraint guide 56, as indicated by arrow 86, and prevents removal of the support post 62 from the head restraint guide 56.

The head restraint guide 56, including the cylindrical tubular body 64, the decorative flange 76 and the snap-finger 66, is unitarily formed from a composite material, wherein flexing of the snap-finger 66 during insertion and removal of the support post 62 of the head restraint assembly 54 does not plastically deform the head restraint guide 56. Thus, the natural position of the snap-finger 66 is extending radially inward from the wall 68 of the cylindrical tubular body 64, as shown in FIG. 5A, and when the support post 62 is inserted the snap-finger 66 can be pushed radially outward without plastically deforming, as shown in FIG. 5B, such that when the notch 70 of the support post 62 reaches the snap-finger 66, the snap-finger 66 will spring back to or toward the natural position, thus engaging the notch 70, as shown in FIG. 5C.

Referring to FIG. 5D, in an exemplary embodiment, the notch 70 within the support post 62 of the head restraint assembly 54 includes a flat upward facing surface 86 and a ramped surface 88, and the snap-finger 66 of the head restraint guide 56 includes a flat downward facing surface 90 and a ramped surface 92, wherein when the snap-finger 66 is engaged with the notch 70, the flat upward facing surface 86 of the notch 70 engages the flat downward facing surface 90 of the snap-finger 66, wherein the snap-finger 66 provides a positive stop preventing the support post 62 of the head restraint assembly 54 from being pulled upward and out of the head restraint guide 56. The orientation of the flat upward facing surface 86 of the notch 70 and the flat downward facing surface 90 of the snap-finger 66 relative to where the snap-finger 66 is flexually connected to the cylindrical tubular body 64 means that force applied by the support post 62 onto the snap-finger 66, as indicated by arrow 94, is carried through the snap-finger 66 directly to the cylindrical tubular body 64, and the snap-finger does not flex, but instead provides a positive stop to prevent removal of the support post 62 from the head restraint guide 56.

Referring to FIG. 5E, if further insertion of the support post 62 is desired, pushing the notch 70 beyond the snap-finger 66, as indicated by arrow 96, the ramped surface 88 of the notch 70 engages the ramped surface 92 of the snap-finger 66, wherein further movement of the support post 62 of the head restraint assembly 54 into the head restraint guide 56 flexes the snap-finger 66 radially outward, as indicated by arrow 98, allowing the support post 62 to be inserted further into the head restraint guide 56. The angled orientation of the ramped surface 88 of the notch 70 and the ramped surface 92 of the snap-finger 66 relative to where the snap-finger 66 is flexually connected to the cylindrical tubular body 64 and the direction of travel of the support post 62, provides for sliding engagement between the ramped surface 88 of the notch 70 and the ramped surface 92 of the snap-finger 66, thus allowing the ramped surface 88 of the notch 70 to gradually push radially outward against the ramped surface 92 of the snap-finger to push the snap-finger radially outward making way for the inserted support post 62.

Thus, once the support post 62 is inserted to where the notch 70 of the support post 62 is beyond the snap-finger 66, a user would be able to move the support post 62 back and forth, upward and downward, pushing the support post 62 further into the head restraint guide 56 or pulling the support post 62 upward within the head restraint guide 56, however, movement of the support post 62 upward would be stopped once the support post 62 is pulled upward to the point where the notch 70 once again engages the snap-finger 66, wherein, the snap-finger 66 will prevent further movement of the support post 62 upward.

Figure 6A:
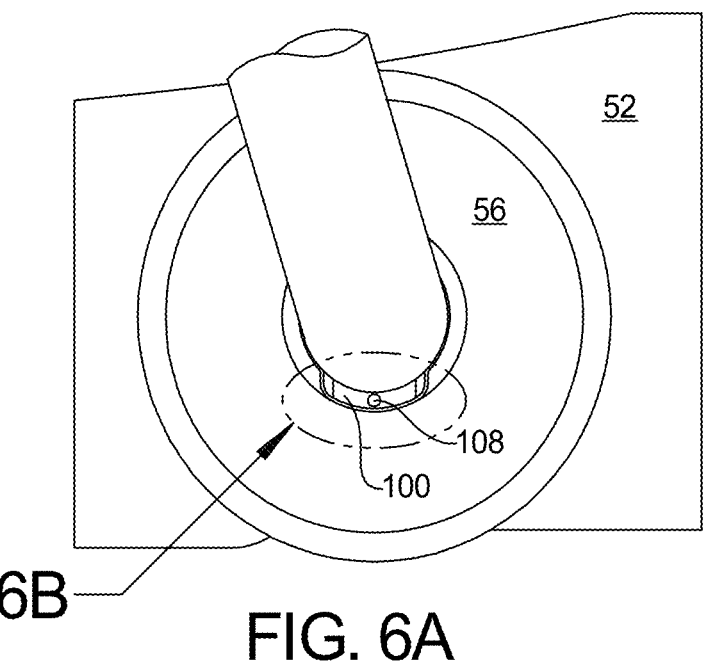
FIG. 6A is a top view of the seat back frame, the head restraint guide, and the support post.
Figure 6B:
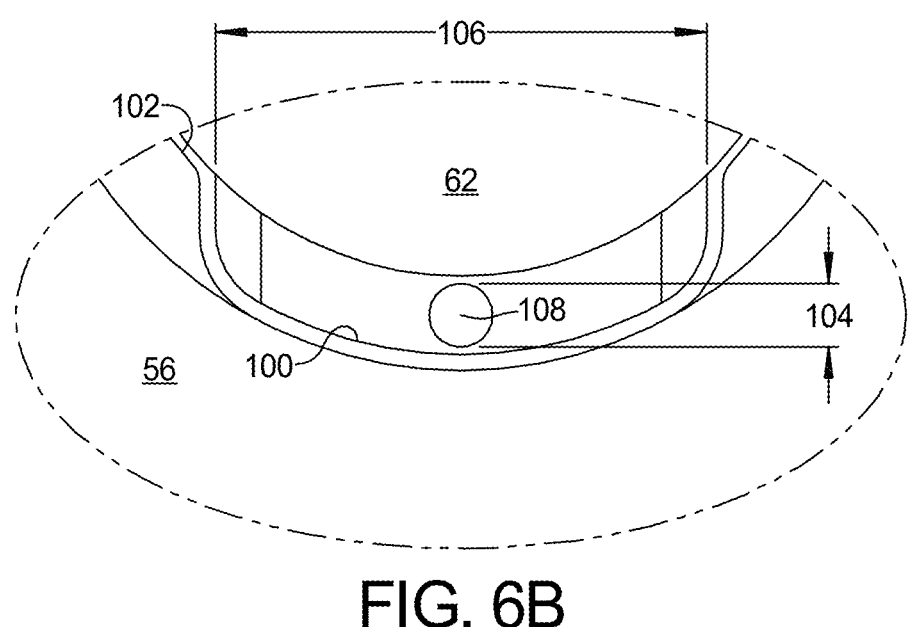
FIG. 6B is an enlarged portion of FIG. 6A, as indicated by the circled portion of FIG. 6A labelled "FIG. 6B"
Figure 6C:
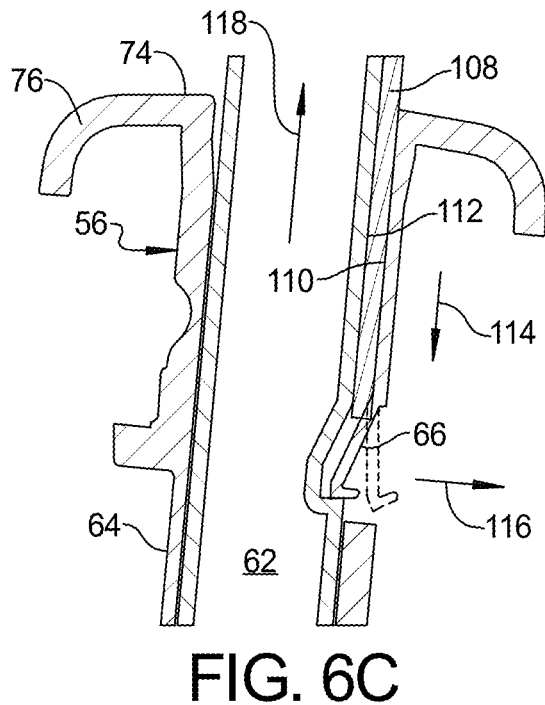
FIG. 6C is a sectional view illustrating the insertion of a tool between an inner surface of the head restraint guide and an outer surface of the support post.

Referring to FIG. 6A, in an exemplary embodiment, the head restraint guide 56 further includes a key-way 100 formed within an inner radial edge 102 of the flange 76 that defines the circular opening 72 within the head restraint guide 56. Referring to FIG. 6B, in an exemplary embodiment the key-way 100 has a radial width 104 that is between approximately nine tenths of a millimeter and approximately two millimeters, and a circumferential length 106 that is between approximately nine tenths of a millimeter and at least two millimeters. Referring to FIG. 6C, the key-way 100 is adapted to allow insertion of a tool 108 between an inner surface 110 of the cylindrical tubular body 64 and an outer surface 112 of the support post 62 of the head restraint assembly 54, as indicated by arrow 114, wherein insertion of the tool 108 flexes the snap-finger 66 radially outward, as indicated by arrow 116 disengaging the snap-finger 66 from the notch 70 in the support post 62 and allowing selective removal of the head restraint assembly 54 from the head restraint guide 56, as indicated by arrow 118.

Referring again to FIG. 4, in an exemplary embodiment, a distance 148 from the head restraint cushion 58 of the head restraint assembly 54 to the flat upward facing surface 86 of the notch 70 formed within the support post 62 of the head restraint assembly 54 is at least the length 150 of the tool 108 used to remove the head restraint assembly 54 from the head restraint guide 56 added to the distance 152 from the top 74 of the cylindrical tubular body 64 to the flat downward facing surface 90 of the snap-finger 66. This ensures that there is adequate space to fit the tool 108 between the decorative flange 76 and the head restraint cushion 58 for selective removal of the head restraint assembly 54 from the head restraint guide 56.

Figure 7:
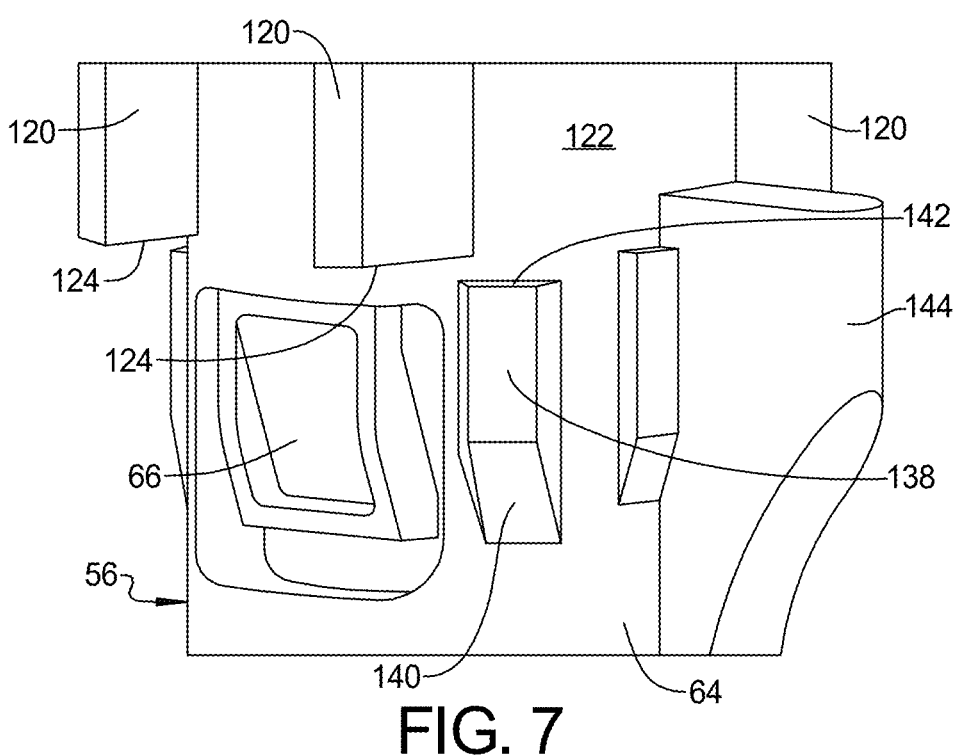
FIG. 7 is an enlarged portion of FIG. 2, as indicated by the circled portion of FIG. 2 labelled "FIG. 7"
Figure 8:
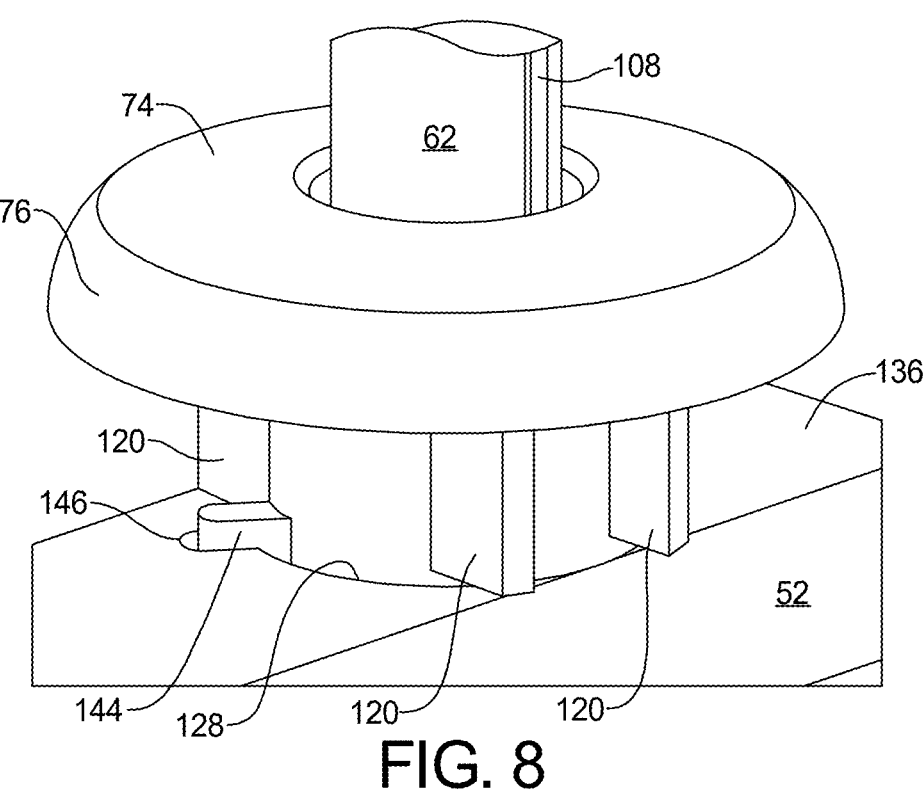
FIG. 8 is an enlarged portion of FIG. 3, as indicated by the circled portion of FIG. 3 labelled "FIG. 8"
Figure 9A:
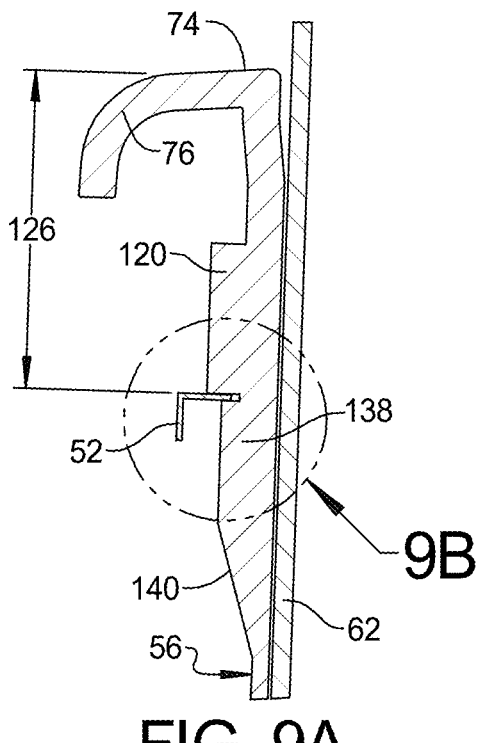
FIG. 9A is a schematic sectional view illustrating the engagement of an inner edge of an orifice within the seat back frame engaged with stand-off ribs and a locking nub of the head restraint guide.
Figure 9B:
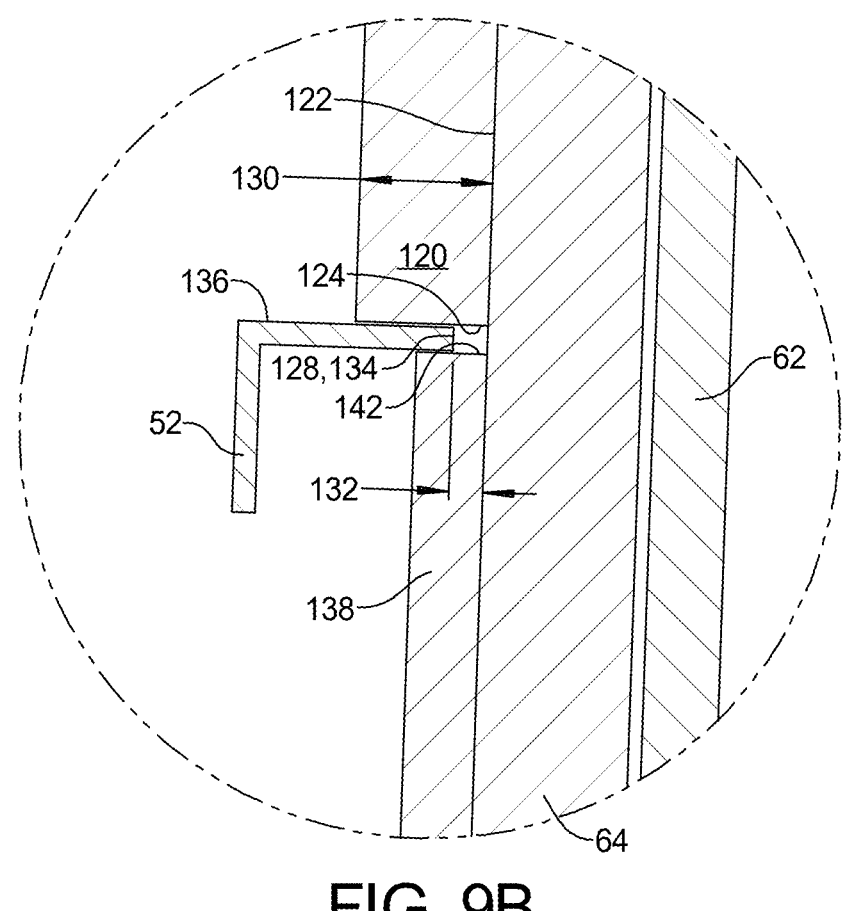
FIG. 9B is an enlarged portion of FIG. 9A, as indicated by the circled portion of FIG. 9A labelled "FIG. 9B".

Referring to FIG. 7, FIG. 8 and FIG. 9A, in an exemplary embodiment the head restraint guide 56 further includes a plurality of stand-off ribs 120 extending longitudinally along and radially outward from an outer surface 122 of the cylindrical tubular body 64. Each one of the plurality of stand-off ribs 120 includes a downward facing horizontal surface 124 adapted to provide a positive stop to support the head restraint guide 56 on the seat back frame 52 and establish a height 126 of the head restraint guide 56 relative to the seat back frame 52. Referring to FIG. 9B, the cylindrical tubular body 64 of the head restraint guide 56 is adapted to be inserted into and supported within an orifice 128 formed within the seat back frame 52, and each one of the plurality of stand-off ribs 120 extends outward from the outer surface 122 of the cylindrical tubular body 64 a distance 130 sufficient to span any clearance 132 between an inner edge 134 of the orifice 128 within the seat back frame 52 and the cylindrical tubular body 64 and to engage a support surface 136 of the seat back frame 52 to provide a positive stop preventing further insertion of the cylindrical tubular body 64 into the orifice 128 and to support the head restraint guide 56 on and relative to the seat back frame 52.

Referring again to FIG. 7 and FIG. 9A, in an exemplary embodiment, the head restraint guide further includes at least one locking nub 138 extending radially outward from the outer surface 122 of the cylindrical tubular body 64 and being positioned below the downward facing surfaces 124 of the plurality of stand-off ribs 120. The locking nub 138 includes a downward facing ramped surface 140 adapted to allow the head restraint guide 56 to be pushed into the orifice 128 within the seat back frame 52, wherein as the head restraint guide 56 is pushed into the orifice 128, the downward facing ramped surface 140 of the locking nub 138 engages the inner edge 134 of the orifice 128 within the seat back frame 52 and causes the cylindrical tubular body 64 of the head restraint guide 56 to flex sufficiently to allow the locking nub 138 to be inserted past the inner edge 134 of the orifice 128. When the head restraint guide 56 is pushed into the orifice 128 within the seat back frame 52 and the downward horizontal surface 124 of each of the plurality of stand-off ribs 120 contact the seat back frame 52 and the locking nub 138 is inserted past the inner edge 134 of the orifice 128, the cylindrical tubular body 64 of the head restraint guide 56 is allowed to flex back wherein the inner edge 134 of the orifice 128 within the seat back frame 52 is captured between the downward facing horizontal surface 124 of each of the plurality of stand-off ribs 120 and an upward facing horizontal surface 142 of the locking nub 138, thereby securing the head restraint guide 56 in position within the seat back frame 52.

Referring again to FIG. 7 and FIG. 8, in an exemplary embodiment, the head restraint guide 56 further includes at least one error-proofing feature 144 extending outward from the outer surface 122 of the cylindrical tubular body 64. The at least one error proofing feature 144 is adapted to fit within a corresponding error-proofing notch 146 formed within the inner edge 134 of the orifice 128 within the seat back frame 52 and adapted to prevent insertion of the head restraint guide 56 into the orifice 128 within the seat back frame 52 in an incorrect orientation. This feature ensures that the head restraint guide 56 is oriented properly and that the notch 70 within the support post 62 will align with the snap-finger 66, thus ensuring proper function of the head restraint guide 56 and the head restraint assembly 54. In other embodiments, the at least one error-proofing feature 144 is further adapted to prevent insertion of the head restraint guide 56 into a non-matching seat back frame 52. For example, referring to FIG. 8, the error-proofing feature 144 fits precisely within the error-proofing notch 146, thus the size and shape of the error proofing feature 144 and the size and shape of the error-proofing notch 146 are designed to allow a specific model of head restraint guide 56 to be installed in a specific model of seat back frame. Thus, the head restraint guide 56 shown in FIG. 8 would not be able to be installed in a seat back frame (not shown) having an error-proofing notch that cannot accommodate the error-proofing feature, and thereby preventing the head restraint guide 56 from being installed within the wrong seat back frame 52.

As mentioned above, the head restraint guide 56, including the cylindrical tubular body 64, the decorative flange 76, the plurality of stand-off ribs 120, the at least one locking nub 138 and the snap-finger 66, is unitarily formed from a composite material, wherein flexing of the snap-finger 66 during insertion and removal of the support post 62 of the head restraint assembly 54 and flexing of the cylindrical tubular body 64 during insertion of the head restraint guide 56 within the seat back frame 52 does not plastically deform the head restraint guide 56.

A vehicle seat 50 of the present disclosure provides a single-piece, integrally formed head restraint guide 56 that prevents inadvertent removal of the headrest assembly 54 from the seat back frame 52, while allowing selective removal of the head restraint assembly 54 from the head restraint guide 56 and the seat back frame 52 using a tool. Further, the head restraint guide of the present disclosure includes stand-off ribs 120 and at least one locking nub 138 to provide a positive stop during installation of the head restraint guide 56 into the seat back frame 52 and to secure the head restraint guide 56 within the seat back frame 52 once installed, and error-proofing features to prevent installation of the head restraint guide 56 in an improper orientation or into an incorrect seat back frame 52.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A vehicle seat, comprising:
a seat back frame;
a head restraint assembly supported on the seatback frame within a head restraint guide, the head restraint guide including:
a cylindrical tubular body adapted to receive a support post of the head restraint assembly therein; and
an integrated snap-finger formed within a side wall of the cylindrical tubular body and extending radially inward and adapted to engage a notch formed within the support post of the head restraint assembly, wherein:
upon insertion of the support post into the cylindrical tubular body of the head restraint guide, the integrated snap-finger is adapted to flex radially outward allowing the support post to slide into the cylindrical tubular body of the head restraint guide; and
when the notch within the support post of the head restraint assembly reaches the integrated snap-finger, the integrated snap-finger engages the notch, wherein, engagement of the integrated snap finger with the notch allows further insertion of the support post into the head restraint guide and prevents removal of the support post from the head restraint guide; and
a circular opening at a top of the cylindrical tubular body;
a decorative flange extending radially outward from the top of the cylindrical tubular body; and
a key-way formed within an inner radial edge of the flange, the key-way adapted to allow insertion of a tool between an inner surface of the cylindrical tubular body and an outer surface of the support post of the head restraint assembly, wherein insertion of the tool flexes the integrated snap-finger radially outward, disengaging the integrated snap-finger from the notch in the support post and allowing selective removal of the head restraint assembly from the head restraint guide.

2. The vehicle seat of claim 1, wherein the notch within the support post of the head restraint assembly includes a flat upward facing surface and a ramped surface, and the integrated snap-finger of the head restraint guide includes a flat downward facing surface and a ramped surface, wherein when the integrated snap-finger is engaged with the notch:
the flat upward facing surface of the notch engages the flat downward facing surface of the integrated snap-finger, wherein the integrated snap-finger provides a positive stop preventing the support post of the head restraint assembly from being pulled upward and out of the head restraint guide; and
the ramped surface of the notch engages the ramped surface of the integrated snap-finger, wherein further movement of the support post of the head restraint assembly into the head restraint guide flexes the integrated snap-finger radially outward allowing the support post to be inserted further into the head restraint guide.

3. The vehicle seat of claim 2, wherein
the key-way has a radial width and a circumferential length.

4. The vehicle seat of claim 3, wherein the radial width is between approximately nine tenths of a millimeter and approximately two millimeters, and the circumferential length is between approximately nine tenths of a millimeter and approximately two millimeters.

5. The vehicle seat of claim 3, wherein the head restraint guide further includes a plurality of stand-off ribs extending longitudinally along and radially outward from an outer surface of the cylindrical tubular body, each of the plurality of stand-off ribs including a downward facing horizontal surface adapted to provide a positive stop to support the head restraint guide on the seat back frame and establish a height of the head restraint guide relative to the seat back frame, the cylindrical tubular body of the head restraint guide adapted to be inserted into and supported within an orifice formed within the seat back frame, each of the plurality of stand-off ribs extending outward from the outer surface of the cylindrical tubular body a distance sufficient to span any clearance between an inner edge of the orifice within the seat back frame and the cylindrical tubular body and to engage a support surface of the seat back frame to provide a positive stop preventing further insertion of the cylindrical tubular body into the orifice and to support the head restraint guide on and relative to the seat back frame.

6. The vehicle seat of claim 5, further including at least one locking nub extending radially outward from the outer surface of the cylindrical tubular body and being positioned below the downward facing surfaces of the plurality of stand-off ribs, the locking nub including a downward facing ramped surface adapted to allow the head restraint guide to be pushed into an orifice within the seat back frame, wherein as the head restraint guide is pushed into the orifice, the downward facing ramped surface of the locking nub engages the inner edge of the orifice within the seat back frame and causes the cylindrical tubular body of the head restraint guide to flex sufficiently to allow the locking nub to be inserted past the inner edge of the orifice, wherein, once the head restraint guide is pushed into the orifice within the seat back frame and the downward horizontal surface of each of the plurality of stand-off ribs contact the seat back frame and the locking nub is inserted past the inner edge of the orifice, the cylindrical tubular body of the head restraint guide is allowed to flex back wherein the inner edge of the orifice within the seat back frame is captured between the downward facing horizontal surface of each of the plurality of stand-off ribs and an upward facing horizontal surface of the locking nub, thereby securing the head restraint guide in position within the seat back frame.

7. The vehicle seat of claim 6, wherein the head restraint guide further includes at least one error-proofing feature extending outward from the outer surface of the cylindrical tubular body, the at least one error proofing feature adapted to fit within a corresponding error-proofing notch formed within the inner edge of the orifice within the seat back frame and adapted to prevent insertion of the head restraint guide into the orifice within the seat back frame in an incorrect orientation.

8. The vehicle seat of claim 7, wherein the at least one error-proofing feature is further adapted to prevent insertion of the head restraint guide into a non-matching seat back frame.

9. The vehicle seat of claim 7, wherein the head restraint guide, including the cylindrical tubular body, the decorative flange, the plurality of stand-off ribs, the at least one locking nub and the integrated snap-finger, is unitarily formed from a composite material, wherein flexing of the integrated snap-finger during insertion and removal of the support post of the head restraint assembly and flexing of the cylindrical tubular body during insertion of the head restraint guide within the seat back frame does not plastically deform the head restraint guide.

10. The vehicle seat of claim 9, wherein a distance from a head restraint cushion of the head restraint assembly to the flat upward facing surface of the notch formed within the support post of the head restraint assembly is at least the length of the tool used to remove the head restraint assembly from the head restraint guide added to the distance from the top of the cylindrical tubular body to the flat downward facing surface of the integrated snap-finger, ensuring that there is adequate space to fit the tool between the decorative flange and the head restraint cushion for selective removal of the head restraint assembly from the head restraint guide.

11. A head restraint guide adapted to support a head restraint assembly within a seat back frame of a vehicle seat, comprising:
a cylindrical tubular body adapted to receive a support post of the head restraint assembly therein; and
an integrated snap-finger formed within a side wall of the cylindrical tubular body and extending radially inward and adapted to engage a notch formed within the support post of the head restraint assembly, wherein:
upon insertion of the support post into the cylindrical tubular body of the head restraint guide, the integrated snap-finger is adapted to flex radially outward allowing the support post to slide into the cylindrical tubular body of the head restraint guide; and
when the notch within the support post of the head restraint assembly reaches the integrated snap-finger, the integrated snap-finger engages the notch, wherein, engagement of the integrated snap finger with the notch allows further insertion of the support post into the head restraint guide and prevents removal of the support post from the head restraint guide; and
a circular opening at a top of the cylindrical tubular body;
a decorative flange extending radially outward from the top of the cylindrical tubular body; and
a key-way formed within an inner radial edge of the flange, the key-way adapted to allow insertion of a tool between an inner surface of the cylindrical tubular body and an outer surface of the support post of the head restraint assembly, wherein insertion of the tool flexes the integrated snap-finger radially outward, disengaging the integrated snap-finger from the notch in the support post and allowing selective removal of the head restraint assembly from the head restraint guide.

12. The head restraint guide of claim 11, wherein the integrated snap-finger includes a flat downward facing surface adapted to engage a corresponding flat upward facing surface formed within the notch of the support post of the head restraint assembly, and a ramped surface adapted to engage a corresponding ramped surface formed within the notch of the support post of the head restraint assembly, wherein when the integrated snap-finger is engaged with the notch:
the flat upward facing surface of the notch engages the flat downward facing surface of the integrated snap-finger, wherein the integrated snap-finger provides a positive stop preventing the support post of the head restraint assembly from being pulled upward and out of the head restraint guide; and
the ramped surface of the notch engages the ramped surface of the integrated snap-finger, wherein further movement of the support post of the head restraint assembly into the head restraint guide flexes the integrated snap-finger radially outward allowing the support post to be inserted further into the head restraint guide.

13. The head restraint guide of claim 12,
the key-way has a radial width and a circumferential length.

14. The head restraint guide of claim 13, wherein the radial width is between approximately nine tenths of a millimeter and approximately two millimeters, and the circumferential length is between approximately nine tenths of a millimeter and approximately two millimeters.

15. The head restraint guide of claim 13, further including a plurality of stand-off ribs extending longitudinally along and radially outward from an outer surface of the cylindrical tubular body, each of the plurality of stand-off ribs including a downward facing surface adapted to support the head restraint guide on the seat back frame and establish a height of the head restraint guide relative to the seat back frame.

16. The head restraint guide of claim 15, further including at least one locking nub extending radially outward from the outer surface of the cylindrical tubular body and being positioned below the downward facing surfaces of the plurality of stand-off ribs, the locking nub including a downward facing ramped surface adapted to allow the head restraint guide to be pushed into an orifice within the seat back frame, wherein once the head restraint guide is pushed into the orifice within the seat back frame and the downward surface of each of the plurality of stand-off ribs contact the seat back frame, an inner edge of the orifice within the seat back frame is captured between the downward facing surface of each of the plurality of stand-off ribs and an upward facing surface of the locking nub, thereby securing the head restraint guide in position within the seat back frame.

17. The head restraint guide of claim 16, further including at least one error-proofing feature extending outward from the outer surface of the cylindrical tubular body, the at least one error proofing feature adapted to fit within a corresponding error-proofing notch formed within the inner edge of the orifice within the seat back frame and adapted to prevent insertion of the head restraint guide into the orifice within the seat back frame in an incorrect orientation.

18. The head restraint guide of claim 17, wherein the at least one error-proofing feature is further adapted to prevent insertion of the head restraint guide into a non-matching seat back frame.

19. The head restraint guide of claim 17, wherein the head restraint guide, including the cylindrical tubular body, the decorative flange, the plurality of stand-off ribs, the at least one locking nub and the integrated snap-finger, is unitarily formed from a composite material, wherein flexing of the integrated snap-finger during insertion and removal of the support post of the head restraint assembly does not plastically deform the head restraint guide.

20. A vehicle having a vehicle seat, comprising:
a seat back frame;
a head restraint assembly supported on the seatback frame within a head restraint guide, the head restraint guide including:

17 a cylindrical tubular body adapted to receive a support post of the head restraint assembly therein;

an integrated snap-finger formed within a side wall of the cylindrical tubular body and extending radially inward and adapted to engage a notch formed within the support post of the head restraint assembly, the notch within the support post of the head restraint assembly including a flat upward facing surface and a ramped surface, and the integrated snap-finger of the head restraint guide including a flat downward facing surface and a ramped surface, wherein:

upon insertion of the support post into the cylindrical tubular body of the head restraint guide, the integrated snap-finger is adapted to flex radially outward allowing the support post to slide into the cylindrical tubular body of the head restraint guide;

when the notch within the support post of the head restraint assembly reaches the integrated snap-finger, the integrated snap-finger engages the notch;

the flat upward facing surface of the notch engages the flat downward facing surface of the integrated snap-finger, wherein the integrated snap-finger provides a positive stop preventing the support post of the head restraint assembly from being pulled upward and out of the head restraint guide; and the ramped surface of the notch engages the ramped surface of the integrated snap-finger, wherein further movement of the support post of the head restraint assembly into the head restraint guide flexes the integrated snap-finger radially outward allowing the support post to be inserted further into the head restraint guide;

a circular opening at a top of the cylindrical tubular body;

a decorative flange extending radially outward from the top of the cylindrical tubular body;

a key-way formed within an inner radial edge of the flange, the key-way adapted to allow insertion of a tool between an inner surface of the cylindrical tubular body and an outer surface of the support post of the head restraint assembly, wherein insertion of the tool flexes the integrated snap-finger radially outward, disengaging the integrated snap-finger from the notch in the support post and allowing selective removal of the head restraint assembly from the head restraint guide;

a plurality of stand-off ribs extending longitudinally along and radially outward from an outer surface of the cylindrical tubular body, each of the plurality of stand-off ribs including a downward facing surface adapted to support the head restraint guide on the seat back frame and establish a height of the head restraint guide relative to the seat back frame;

at least one locking nub extending radially outward from the outer surface of the cylindrical tubular body and being positioned below the downward facing surfaces of the plurality of stand-off ribs, the locking nub including a downward facing ramped surface adapted to allow the head restraint guide to be pushed into an orifice within the seat back frame, wherein once the head restraint guide is pushed into the orifice within the seat back frame and the downward surface of each of the plurality of stand-off ribs contact the seat back frame, an inner edge of the orifice within the seat back frame is captured between the downward facing surface of each of the plurality of stand-off ribs and an upward facing surface of the locking nub, thereby securing the head restraint guide in position within the seat back frame; and at least one error-proofing feature extending outward from the outer surface of the cylindrical tubular body, the at least one error proofing feature adapted to fit within a corresponding error-proofing notch formed within the inner edge of the orifice within the seat back frame and adapted to prevent insertion of the head restraint guide into the orifice within the seat back frame in an incorrect orientation; and wherein, the head restraint guide, including the cylindrical tubular body, the decorative flange, the plurality of stand-off ribs, the at least one locking nub and the integrated snap-finger, is unitarily formed from a composite material, wherein flexing of the integrated snap-finger during insertion and removal of the support post of the head restraint assembly does not plastically deform the head restraint guide.

* * * * *